June 13, 1967 G. H. REICKS 3,324,722
CONTINUOUS FLUID LEVEL MEASURING APPARATUS
Filed Dec. 23, 1964
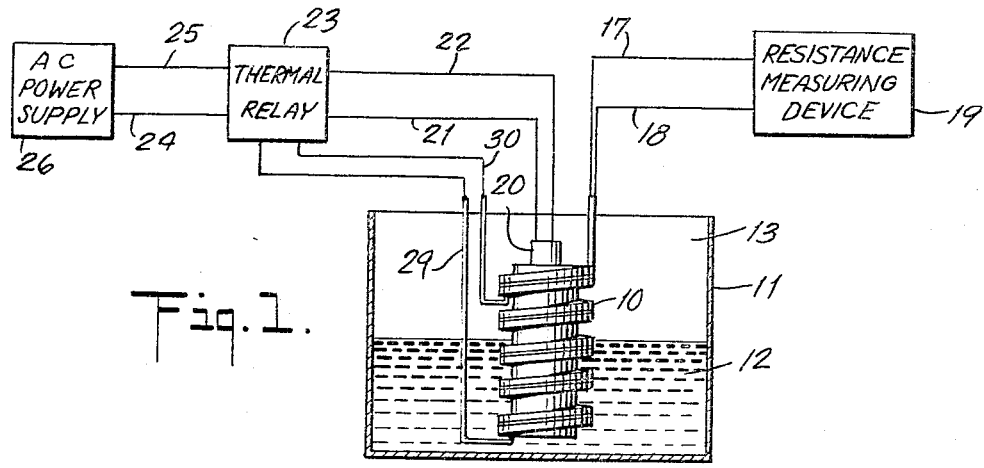
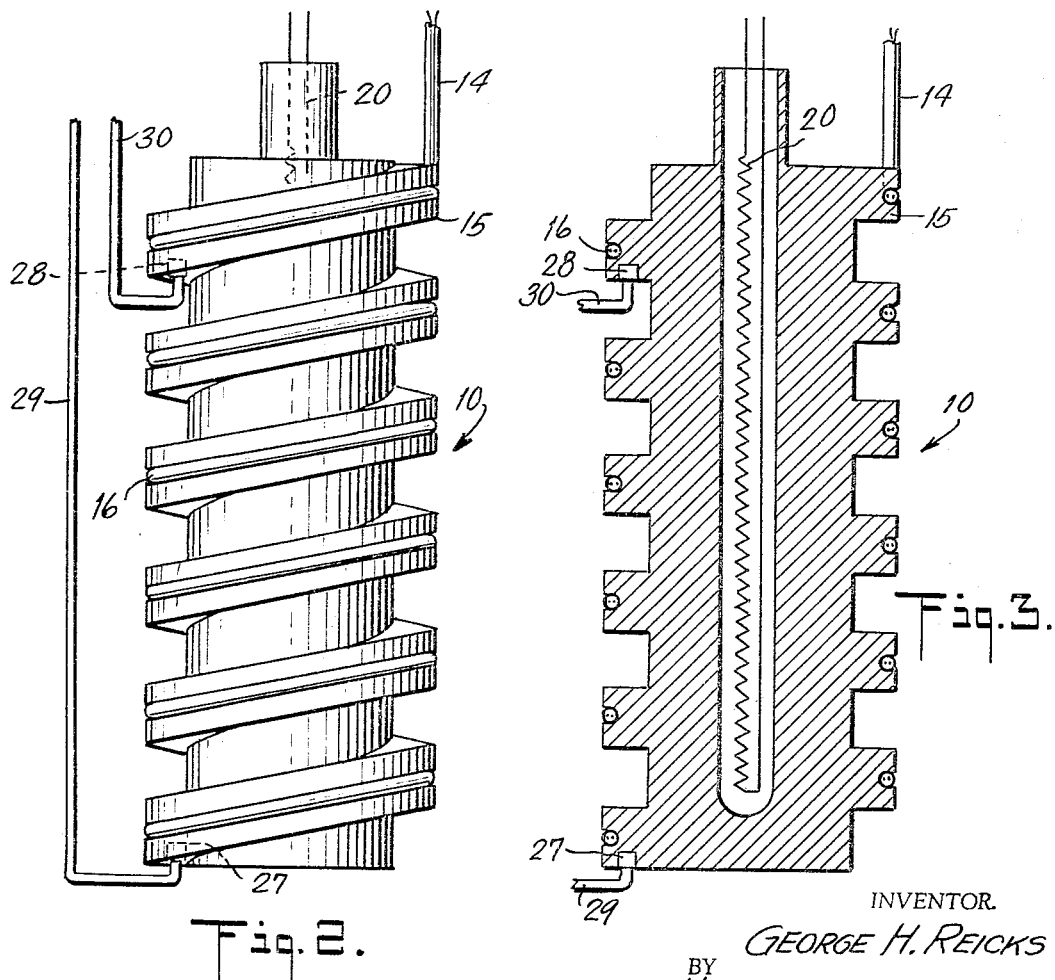
INVENTOR.
GEORGE H. REICKS
BY
Ward, Haselton, McElhannon,
Orme, Brooks & Fitzpatrick
ATTORNEYS

United States Patent Office 3,324,722
Patented June 13, 1967

3,324,722
CONTINUOUS FLUID LEVEL MEASURING APPARATUS
George H. Reicks, Trenton, Mich., assignor to Atomic Power Development Associates, Inc., Detroit, Mich., a corporation of New York
Filed Dec. 23, 1964, Ser. No. 420,709
13 Claims. (Cl. 73—295)

This invention relates generally to apparatus for measuring or sensing changes in the level of a fluid in a container, and more particularly to a continuous fluid level measuring apparatus utilizing a conductor whose resistance changes with temperature in order to measure and sense any changes in the level of a fluid in a container.

There are various forms of devices and apparatus well-known in the art for measuring the level of a fluid within a container. Those known devices, however, are generally mechanically and electrically complicated and are not suitable for the remote and rapid indication of fluid level.

A feature of this invention resides in the provision of a new and improved device which continuously senses and indicates the level of a liquid in a container, and which is capable of communicating such levels rapidly to a remote location. According to the present invention, as another feature thereof, the device for indicating a level of liquid in a container can be employed for measuring the liquid level of high temperature fluids, including liquid metals, and also for measuring the liquid level of both dielectric and conductive fluids.

These and further objects and features of the invention will become apparent from a reading of the following detailed description of a preferred embodiment of the invention, the description to be read in conjunction with the accompanying drawings in which like components in the several views are identified by the same reference numerals.

In the drawings:

FIGURE 1 is a block diagram illustrating the principles of the invention;

FIGURE 2 is an enlarged view of the probe of the present invention and;

FIGURE 3 is a cross-section of the probe of the present invention illustrated in FIGURE 2.

Briefly stated the continuous fluid level measuring apparatus of the present invention includes an insulated conductor whose resistance changes linearly with changes in temperature over its operating range. The conductor is imbedded in the fin edges of a fin-type probe. The probe is fixed in position within the container that is to contain the fluid whose level is to be detected and measured. The probe may vary in design length from a few inches to many feet depending on the fluctuations of the fluid level within the container. Positioned axially within the probe and extending therethrough is a heating element. In operation a portion of the probe is submerged in the fluid whose level is to be detected and measured and a portion extends into the space above the surface of the fluid. The space above the fluid is preferably filled with inert gas but this space can be occupied by any gas, such as air, having a low thermal conductivity. When the heating element is activated the fluid conducts the heat away from that portion of the probe below the level of the fluid so that the portion of the conductor in the fluid remains at substantially the same temperature as the surrounding fluid. The portion of the conductor, however, above the fluid, is maintained at a temperature higher than the fluid temperature by the heating element and by the fact that the gas above the fluid has a low thermal conductivity relative to the thermal conductivity of the fluid. The probe is calibrated such that any change in resistance of the probe due to a change in temperature can be equated to changes in the level of the fluid. In this manner a continuous and accurate measurement can be obtained of any changes in the level of the fluid and the amount by which this fluid level has changed.

Referring now to the figures, the probe of the present invention is identified in general by the numeral 10. The probe 10 is preferably of the fin-tube type and made from metal, such, for example, as stainless steel, which will not be adversely affected by the fluid whose level is to be sensed and measured.

The probe 10 is rigidly mounted within a container or vessel 11 having therein a fluid 12 whose changes in level are to be continuously sensed and measured. It is essential to the invention that a portion of the probe 10 at all times be submerged in the fluid 12 whose level is to be measured, and that a portion of the probe 10 extend into the space 13 above the level of the fluid 12 within the container 11. The probe 10 may vary in length from a few inches to many feet, depending upon the extent of fluid level change it is desired to sense and measure.

A conductive cable 14 is wrapped around and imbedded in the ends of the fin tips 15 of the probe 10. In order to retain the cable 14 the ends or periphery of the fins 15 on the probe 10 are provided with grooves 16, which are large enough to receive the cable 14. The cable 14 is held in the groove 16 by any well-known means, such, for example, as by spot welding.

The cable 14 must be a high resistance conductor, whose resistance preferably varies linearly over the operating temperature range to which the cable 14 will be exposed. It has been found that nickel and platinum wire meets these requirements and can be used in the practice of the present invention. In order to protect the cable 14 from being adversely affected by the fluid 12, the cable 14 is covered with a sheath, such, for example, as stainless steel, which will not be affected by the fluid 12. In order to prevent grounding or shorting of the cable 14, the cable 14 is covered with an insulator before applying the outer sheath. It has been found that suitable insulating coatings are aluminum oxide and magnesium oxide.

The cable 14 is connected by a pair of lines 17 and 18 to a resistance measuring device 19. The resistance measuring device 19 can consist of any well-known device for detecting and measuring any change in resistance of the cable 14, and may consist of an ohm meter but preferably consists of a device wherein the cable 14 is part of a Wheatstone bridge circuit and which enables precise measurement of any change in resistance of the cable 14.

Positioned within the probe 10 and extending axially the length thereof is a bayonet heating element 20 of any well-known type. The heater 20 is connected by a pair of lines 21 and 22 to a thermal relay 23 which activates and deactivates the heater 20. The thermal relay 23 is connected by a pair of lines 24 and 25 to an AC power supply 26. The thermal relay 23 is set to maintain a predetermined temperature differential between the temperature of the conductor 14 in the fluid 12 and the temperature of the conductor 14 in the gas in the space 13 above the level of the fluid 12. The temperature of the conductor 14 in the fluid 12 and of the conductor 14 in the gas in the space 13 is measured by any well-known means, such, for example, as by the thermocouples 27 and 28. The thermocouples 27 and 28 are attached to the fin tips of the probe 10, one thermocouple 27 being attached to a portion of the probe 10 that will always be immersed in the fluid 12, and the other thermocouple 28 being attached to a portion of the probe 10, which will always be in the space 13 above the fluid 12. The thermocouples 27 and 28 are connected respectively by lines 29 and 30 to the thermal relay 23.

In operation the space 13 above the fluid 12 in the container 11 may be evacuated or filled with an inert gas such as argon, for example, or with air. If the space 13 is evacuated or filled with an inert gas, the container 11 must, of course, be sealed. The only time that it is necessary to use an inert gas in the practice of the present invention is if the fluid whose level is being measured reacts in an undesired manner with air, which thereby necessitates the use of an inert gas. For example, if the fluid being used whose level is to be measured is sodium, the space 13 cannot be filled with air but must be filled with an inert gas such as argon. The only limitation is that the thermal conductivity of the fluid 12 be much greater than the thermal conductivity of the gas in the space 13.

In the operation of the apparatus of the present invention the thermal relay 23 is set to heat the fin tips 15 in gas in the space 13 to a temperature substantially higher than the temperature of the fin tips in the fluid 12. The thermocouples 27 and 28 sense the temperature respectively of the fin tips in fluid and of the fin tips in the gas and the thermal relay activates and deactivates the heater 20 to maintain the temperature differential between the fluid and gas at the desired amount. The fins 15 on the probe 10 conduct the heat away from the portion of the probe 10 below the level of the fluid 12 so that the sheathed cable 14 remains at substantially the same temperature as the surrounding fluid 12 in the container 13. The sheathed cable 14 above the fluid 12 in the gas space 13 is maintained at a temperature substantially higher than the temperature of the fluid 12 by means of the heater 20. The temperature on the fin tips 15 of the probe 10 exposed to the gas in the space 13 will accordingly be substantially higher due to the low thermal conductivity of the gas relative to the thermal conductivity of the fluid 12. This difference in temperature results in a difference of resistance in the cable 14. The resistance measuring device 19 is preferably calibrated to convert this difference in resistance into changes in the level of the fluid 12. Thus, any variation in the level of the fluid 12 results in a change in resistance of the cable 14, this change in resistance being detected and measured by the resistance measuring device 19. From this measurement it can be determined exactly how much the level of the fluid 12 changes.

The apparatus of the present invention does not require any temperature compensation after the instrument has been initially calibrated provided the operational temperature range of the gas and fluid does not exceed the range where the coefficient of resistivity of the cable 14 remains linear. This results from operating the probe 10 in such a manner as to maintain a constant temperature differential between the fin portion of the probe 10 exposed to the gas in the space 13 and the fin portion of the probe 10 immersed in the fluid 12. If the probe 10 is used in such a manner that the temperature changes extend beyond the range where the coefficient of resistivity of the cable 14 is linear, it is necessary to recalibrate the probe 10 in order to include the new temperature compensation.

What has been described is an apparatus for continuously detecting and measuring any changes in the level of a fluid within a container. The apparatus of the present invention is not limited by either the temperature or pressure range in which it can be used or by whether the fluid is conductive or non-conductive, or corrosive or non-corrosive. It will be obvious to those skilled in the art to which this invention pertains that various changes and modifications may be made thereto without departing from the spirit and scope of this invention as defined by the claims appended hereto.

What is claimed as new and desired to be secured by Letters Patent is:

1. A device for detecting changes in the level of a fluid, said device comprising an elongated tubular probe, a conductor attached to the exterior of said probe and extending substantially the length thereof, the resistance of said conductor varying with changes in temperature, a heater within said probe and extending substantially axially the length thereof, said probe being partially immersed in the fluid whose changes in level are to be detected, means for energizing said heater, said fluid having a much greater thermal conductivity than said gas surrounding said exposed portion of said probe whereby said heater does not appreciably raise the temperature of said probe adjacent said conductor in said fluid but raises the temperature of said probe adjacent said conductor in said gas substantially above the temperature of said probe in said fluid, means for measuring the temperature of said probe adjacent said conductor in said fluid and said probe adjacent said conductor in said gas, said temperature measuring means being connected to said heater energizing means to maintain the temperature of said probe in said fluid and said probe in said gas at a preselected differential, and means connected to said conductor for detecting changes in the resistance thereof as said fluid level changes.

2. A device for detecting changes in the level of a fluid, said device comprising an elongated tubular probe having fins connected thereto and extending helically the length thereof, a conductor attached to the ends of said fins, the resistance of said conductor varying with changes in temperature, a heater within said probe and extending substantially axially the length thereof, said probe being partially immersed in the fluid whose changes in level are to be detected, means for energizing said heater, said fluid having a much greater thermal conductivity than said gas surrounding said exposed portion of said probe whereby said heater does not appreciably raise the temperature of said probe adjacent said conductor in said fluid but raises the temperature of said probe adjacent said conductor in said gas substantially above the temperature of said probe adjacent said conductor in said fluid, and means connected to said conductor for detecting changes in the resistance thereof as said fluid level changes.

3. A device for detecting changes in the level of a fluid, said device comprising an elongated tubular probe having fins connected thereto and extending helically the length thereof, a conductor, the resistance of said conductor varying with changes in temperature, the ends of said fins being provided with grooves to receive said conductor, a heater within said probe and extending substantially axially the length thereof, said probe being partially immersed in the fluid whose changes in level are to be detected, means for energizing said heater, said fluid having a much greater thermal conductivity than said gas surrounding said exposed portion of said probe whereby said heater does not appreciably raise the temperature of said probe adjacent said conductor in said fluid but raises the temperature of said probe adjacent said conductor in said gas substantially above the temperature of said probe adjacent said conductor in said fluid, and means connected to said conductor for detecting changes in the resistance thereof as said fluid level changes.

4. A device for detecting changes in the level of a fluid, said device comprising an elongated tubular probe having fins connected thereto and extending helically the length thereof, a conductor, the resistance of said conductor varying with changes in temperature, the ends of said fins being provided with grooves to receive said conductor, a heater within said probe and extending substantially axially the length thereof, said probe being partially immersed in the fluid whose changes in level are to be detected, means for energizing said heater, said fluid having a much greater thermal conductivity than said gas surrounding said exposed portion of said probe whereby said heater does not appreciably raise the temperature of said probe adjacent said conductor in said fluid, means for measuring the temperature of said probe adjacent said conductor in said fluid and said probe adjacent said conductor in said gas, said temperature measuring means being connected to said heater energizing means to maintain the temperature of said probe in said fluid and said probe in said gas at preset values, and means connected to said conductor for detecting changes in the resistance thereof as said fluid level changes.

5. A device for continuously detecting and measuring changes in the level of a fluid, said device comprising an elongated tubular probe having fins connected thereto and extending helically the length thereof, an insulated conductor, the resistance of said conductor varying with changes in temperature, the ends of said fins being provided with grooves to receive said conductor, a heater within said probe and extending substantially axially the length thereof, said probe being partially immersed in the fluid whose changes in level are to be detected, means for energizing said heater, said fluid having a much greater thermal conductivity than said gas surrounding said exposed portion of said probe whereby said heater does not appreciably raise the temperature of said probe adjacent said conductor in said fluid but raises the temperature of said probe adjacent said conductor in said gas substantially above the temperature of said probe adjacent said conductor in said fluid, measuring means on said probe for measuring the temperature of said probe adjacent said conductor in said fluid and said probe adjacent said conductor in said gas, said temperature measuring means being connected to said heater energizing means to maintain the temperature of said probe in said fluid and said probe in said gas at preset values, and means connected to said conductor for detecting changes in the resistance thereof as said fluid level changes.

6. A device for indicating the level of liquid in a container comprising a member positionable partially within and partially above the liquid, an elongated conductor carried by said member and extending partially within and partially above the liquid, the resistance of said conductor varying with changes in temperature thereof, heating means for said conductor, means for controlling said heating means for maintaining a preselected temperature differential between the portion of the conductor extending within the liquid and the portion above the liquid, and means connected to said conductor for detecting changes in the resistance thereof.

7. A device for indicating the level of liquid in a container comprising a member having a generally helical surface of substantially uniform distance between convolutions, said surface being positionable partially within and partially above the liquid, an elongated conductor extending adjacent said surface partially within and partially above the liquid, the resistance of said conductor varying with changes in temperature thereof, heating means for said conductor, means for controlling said heating means for maintaining a preselected temperature differential between the portion of the conductor extending within the liquid and the portion above the liquid, and means connected to said conductor for detecting changes in the resistance thereof.

8. A device for indicating the level of liquid in a container comprising a member positionable partially within and partially above the liquid, an elongated conductor carried by said member and extending partially within and partially above the liquid, the resistance of said conductor varying with changes in temperature thereof, a heater carried by said member for heating said conductor, means for measuring the temperature of said conductor above said liquid, means for controlling said heater for maintaining a preselected temperature differential between the portion of the conductor extending within the liquid and the portion above the liquid, and means connected to said conductor for detecting changes in the resistance thereof.

9. A device for indicating the level of liquid in a container comprising an elongated probe of thermal conductable material positionable partially within and partially above the liquid, a conductor carried by said member and extending substantially the length thereof, the resistance of said conductor varying with changes in temperature thereof, a heater disposed within said probe and extending substantially axially the length thereof, means for measuring the temperature of said probe adjacent said conductor in said fluid, means for measuring the temperature of said probe adjacent said conductor above said fluid, means for controlling said heater for maintaining a preselected temperature differential between the portion of the conductor extending within the liquid and the portion above the liquid, and means connected to said conductor for detecting changes in the resistance thereof.

10. A device for indicating the level of liquid in a container comprising an elongated probe of thermal conductable material having a generally helical surface of fin-like protrusions for supporting a conductor at a position extending radially outwardly further than the main body portion of the probe and being positionable partially within and partially above the liquid, the resistance of said conductor varying with changes in temperature thereof, a heater disposed within said probe and extending substantially axially the length thereof, means for measuring the temperature of said probe adjacent said conductor in said fluid, means for measuring the temperature of said probe adjacent said conductor above said fluid, means for controlling said heater for maintaining a preselected temperature differential between the portion of the conductor extending within the liquid and the portion above the liquid, and means connected to said conductor for detecting changes in the resistance thereof.

11. A device according to claim 10 wherein said liquid is liquid metal, and wherein said conductor is electrically insulated from said liquid metal but is in good thermal conductive relation thereto.

12. A device according to claim 11 wherein said conductor is insulated with a metal oxide.

13. A method of indicating the level of a liquid in a container comprising the steps of positioning a conductor, whose resistance varies with changes in temperature, partially within and partially above the liquid, raising the temperature of the conductor until the temperature differential between the portion of the conductor extending within the liquid and the portion above the liquid attains a preselected value, and measuring the resistance of said conductor, whereby any change in the level of said conductor in said fluid is reflected in a change in resistance of said conductor.

References Cited

UNITED STATES PATENTS 2,456,617  12/1948  Burch _____ 73—295
3,031,887   5/1962  Weisend _____ 73—295

FOREIGN PATENTS 381,811  10/1932  Great Britain.

DAVID SCHONBERG, *Primary Examiner.*

LOUIS R. PRINCE, *Examiner.*

S. C. SWISHER, *Assistant Examiner.*